United States Patent
Hamlet

(10) Patent No.: US 10,262,098 B1
(45) Date of Patent: Apr. 16, 2019

(54) FIELD PROGRAMMABLE GATE ARRAY BITSTREAM VERIFICATION

(71) Applicant: National Technology & Engineering Solutions of Sandia, LLC, Albuquerque, NM (US)

(72) Inventor: Jason Hamlet, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 295 days.

(21) Appl. No.: 14/927,046

(22) Filed: Oct. 29, 2015

(51) Int. Cl.
*G06F 17/50* (2006.01)
*G06F 9/455* (2006.01)

(52) U.S. Cl.
CPC .............. *G06F 17/5081* (2013.01)

(58) Field of Classification Search
CPC ............ G06F 17/5022; G06F 17/5054; G06F 17/505; G06F 17/5027; G06F 11/26; G06F 17/5045; G06F 21/00
See application file for complete search history.

(56) References Cited

U.S. PATENT DOCUMENTS

| | | | | |
|---|---|---|---|---|
| 6,381,565 B1 * | 4/2002 | Nakamura | ..... | G01R 31/318357 703/28 |
| 7,558,995 B1 * | 7/2009 | Simmons | ....... | G01R 31/318516 714/700 |
| 7,684,783 B1 * | 3/2010 | Vacon | ................... | H04W 12/06 370/338 |
| 8,635,571 B1 * | 1/2014 | Goldman | ............ | G06F 17/5054 716/116 |
| 2005/0071730 A1 * | 3/2005 | Moyer | ................ | G06F 11/1004 714/758 |
| 2014/0043059 A1 * | 2/2014 | Speers | ................ | H03K 19/003 326/9 |

OTHER PUBLICATIONS

Markovic, et al., "ASIC Design and Verification in an FPGA Environment", IEEE 2007 Custom Integrated Circuits Conference (CICC), 2007, pp. 737-740.
Swierczynski, et al., "FPGA Trojans through Detecting and Weakening of Cryptographic Primitives", Computer-Aided of Design of Integrated Circuits and Systems, IEEE Transactions, Feb. 2015, vol. 99. pp. 1-14.
Majzoobi, et al., "FPGA-oriented Security", Introduction to Hardware Security and Trust, Chapter 1, 2011, pp. 1-38.
Drimer, "Volatile FPGA Design Security—a Survey", IEEE Computer Society 2008, version 0.96, Apr. 2008, pp. 1-51.

* cited by examiner

*Primary Examiner* — Nghia M Doan
(74) *Attorney, Agent, or Firm* — Medley, Behrens & Lewis, LLC

(57) ABSTRACT

Described herein are various technologies pertaining to confirming an integrity of a FPGA. A verifier circuit is placed into an FPGA bitstream to enable external verification of the FPGA configuration in real time without requiring readout of the FPGA configuration itself. Number generators are utilized to generate a key which is shared between the FPGA and an external verification component (VC). The key is utilized to configure an initial state of sequence registers respectively located on both the FPGA and the VC. When the FPGA is operating with an approved configuration, output from the sequence registers at the FPGA and the VC are the same.

16 Claims, 4 Drawing Sheets

FIELD PROGRAMMABLE GATE ARRAY BITSTREAM VERIFICATION

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A field programmable gate array (FPGA) is an integrated circuit designed to be configured by an end user after manufacture of the FPGA, hence the term "field programmable". One or more blocks of a FPGA can be configured, wherein the configuration can occur during initial implementation (e.g., activation) of the FPGA, or at any time thereafter. Accordingly, it may be desired to know when a configuration applied to the FPGA has been modified. For example, a FPGA may be incorporated into a system monitoring operation of a machine, e.g., via measurements being received at the FPGA from a plurality of sensors. A technician may have configured the FPGA to monitor the sensors in a particular manner, e.g., a particular sensor(s) is located at a particular input(s), a magnitude of reading is configured in accordance with a magnitude of a signal being received from a sensor, etc. Accordingly, the technician does not want the FPGA to be reconfigured during the machine monitoring period. Thus, if the FPGA is reconfigured, the technician would like to know immediately of such reconfiguration. The reconfiguration may occur for a multitude of reasons, such as accidental reconfiguration, component failure, malicious intent, etc.

In a conventional approach, a FPGA can have a particular configuration applied thereto, and a "configuration setting" can be retained in memory of the FPGA. The configuration setting can be transmitted to a monitoring system, e.g., a remotely located computer, where it is stored as an initial configuration for future comparison. At a subsequent time, a current configuration setting can be re-transmitted from the FPGA to the computer, wherein the computer can compare the current transmitted setting with the previously stored initial setting. If the settings match, then the FPGA has not been modified, whereas, if the settings do not match, then the FPGA can be considered to have undergone reconfiguration. However, the conventional approach renders the system susceptible to attack (e.g., a man-in-the-middle attack), as the configuration setting being transmitted from the FPGA can be captured and utilized maliciously. For example, in a malicious attack (e.g., a replay attack), the configuration setting can continue to be transmitted to the computer even though the FPGA has undergone reconfiguration.

SUMMARY

The following is a brief summary of subject matter that is described in greater detail herein. This summary is not intended to be limiting as to the scope of the claims.

Described herein are various technologies related to monitoring integrity of a field programmable gate array (FPGA). The various embodiments presented herein utilize a combination of a verification circuit in a FPGA in conjunction with a verification component, wherein the verification component can be configured to check and/or verify the integrity of the FPGA configuration based upon signals generated by the verification circuit. The verification can be performed in real-time without requiring readout of the FPGA configuration from memory of the FPGA.

In an embodiment, the FPGA can include at least one random number generator. The random number generator outputs a value, and a shared cryptographic key (shared between the FPGA and the verification component) can be generated based upon the value. The FPGA can further include at least one feedback register, wherein the state of the feedback register can be set to an initial state and shared with the verification component through any suitable technique. In an example, the initial state of the feedback register can be based upon the value (or another value) output by the random number generator. In a non-limiting example, the FPGA can encrypt the initial state of the feedback register with the shared cryptographic key, and the (encrypted) initial state can be transmitted to the verification component. The verification component can decrypt the initial state using the shared cryptographic key. In another example, the initial state of the feedback register can be set during construction of the shared cryptographic key. In an example, the verification component can include a feedback register that is identical to the feedback register of the FPGA, and can be initialized with the initial state. In another example, the verification component can include memory, and the initial state can be retained in the memory. Optionally, the state of the feedback register of the FPGA may be updated at runtime of the FPGA. Accordingly, the state at the verification component is to be synchronized with the state of the feedback register of the FPGA. In an example, the FPGA and the verification component can be in communication with a shared clock, and the state of the feedback register can be synchronously updated at the FPGA and the verification component periodically based upon clock signals emitted by the shared clock. In another example, the FPGA can update the state of the feedback register some fixed number of times between verifications; accordingly, the verification component can likewise update the state the fixed number of times between verifications. Other mechanisms for synchronizing the state are contemplated.

The FPGA can then be operated in accordance with its configuration. At some point in time, the verification component verifies the configuration of the FPGA. This can occur periodically, when the FPGA requests that its configuration be verified, or when the verification component initiates a request to verify the configuration of the FPGA. When the FPGA is to be verified, the state of the feedback register of the FPGA is acquired from the feedback register, and the FPGA encrypts the state using the shared cryptographic key. The encrypted state is transmitted to the verification component. The verification component receives the encrypted state and uses the shared key to decrypt the encrypted state. The verification component then compares the state of the feedback register of the FPGA with the state retained at the verification component. As the state of the feedback register is synchronized between the FPGA and the verification component, the states should be equivalent. If the states are inequivalent, then it can be ascertained that the configuration of the FPGA has been altered, and an alarm can be generated.

As will be described in more detail below, the FPGA may include several random number generators and several feedback registers. In such case, output of the random number generators can be combined using a suitable function to generate a seed value, and the shared cryptographic key can be constructed based upon the seed value. Similarly, the states of the feedback registers can be combined using a suitable function to generate a combined value, and the FPGA can encrypt the combined value using the shared cryptographic key. The verification component decrypts the combined value. When verifying the configuration of the FPGA, the FPGA can acquire the states of the feedback registers, generate the combined value, encrypt the combined value, and transmit the (encrypted) combined value to the verification component. The verification component decrypts the combined value, acquires the states of the feedback registers retained at the verification component, combines the states to generate a second combined value, and compares the combined value with the second combined value.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
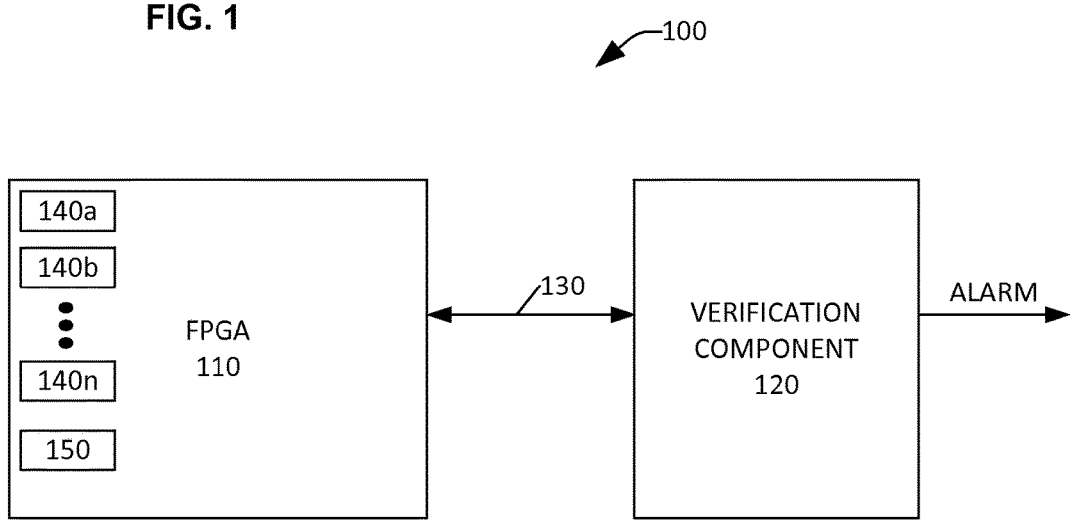
FIG. 1 illustrates an exemplary system for detecting modification of a FPGA.

Various technologies are presented herein pertaining to confirming integrity of a field programmable gate array (FPGA), wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", "circuit", and "system" are also intended to encompass hardware configured to cause certain functionality to be performed, where such hardware can include, but is not limited to including FPGAs, Application-specific Integrated Circuits (ASICs), Application-specific Standard Products (ASSPs), System-on-a-chip systems (SOCs), Complex Programmable Logic Devices (CPLDs), etc.

FIG. 1 illustrates an exemplary system 100 that can be utilized to verify an operational integrity of a FPGA, e.g., whether the FPGA is operating with an approved (desired) configuration or the configuration has been changed. The system 100 includes an FPGA and a verification component 120, wherein communication between the FPGA 110 and the verification component 120 is via a path 130, with path 130 being any of a trace in an integrated circuit, a wired communication, a wireless communication, etc. Path 130 acts as conduit for transmission of data between the FPGA 110 and the verification component 120. In an example, the verification component 120 can be a FPGA, an ASIC, a processor and coupled memory, etc.

As shown, the FPGA 110 can include a plurality of reconfigurable blocks, wherein one or more of the reconfigurable blocks can be partial reconfiguration blocks 140a-140n (where n is a positive integer greater than 1), and further, one or more of the reconfigurable blocks can be non-partially reconfigurable blocks 150. Each reconfigurable block can include a number generator (e.g., a true random number generator (TRNG)) and also a feedback register (e.g., a linear feedback shift register (LFSR)). When the verification component 120 is an FPGA, the verification component 120 can also include a number generator(s) and one or more feedback registers. In other examples, the verification component 120 can be configured to mimic operation of a feedback register and/or random number generator.

As further described, various embodiments presented herein comprise the FPGA 110 and the verification component 120 operating in conjunction to construct a shared cryptographic key, wherein the shared cryptographic key is shared between the FPGA 110 and the verification component 120. Additionally, initial states for the LFSRs at the FPGA 110 can be shared between the FPGA and the verification component 120. For instance, the initial states can be agreed upon between the FPGA 110 and the verification component 120, wherein transmission of the initial states between the FPGA 110 and the verification component 120 can be protected by the shared cryptographic key. The LFSRs are set with the initial states, and the verification component 120 is provided with knowledge of the initial states. In an example, when the verification component 120 is an FPGA, LFSRs of the verification component 120 can be set with the initial states. In another example, when the verification component 120 comprises a processor and associated memory, the initial states can be retained in the memory.

During operation of the FPGA 110, the states of the LFSRs can be updated. As will be described in greater detail below, the verification component 120 verifies the configuration of the FPGA 110 by comparing the states of the LFSRs received from the FPGA 110 with states of the LFSRs maintained at the verification component 120. Accordingly, alterations to the states of the LFSRs of the FPGA 110 must be mimicked at the verification component 120. To allow for such mimicking, states of the LFSRs of the FPGA 110 and states maintained at the verification component 120 can be synchronized in a variety of manners. In an example, the states of the LFSRs at the FPGA 110 and the states maintained by the verification component 120 can be updated through use of a shared clock, where the states are updated periodically based upon clock signals output by the shared clock. In another example, it can be known that the FPGA 110 updates the states of the LFSRs X times between each verification performed by the verification component 120, where X is greater than 0.

When the verification component 120 is to verify the configuration of the FPGA 110, the FPGA 110 can acquire the states of the LFSRs, combine the states using a suitable function (to generate a combined value), and encrypt the combined value using the shared cryptographic key. The FPGA 110 then transmits the (encrypted) combined value to the verification component 120. The verification component 120 obtains the states of the LFSRs retained at the verification component 120 and combines the states using the suitable function (the same function used by the FPGA 110) to generate a second combined value. Responsive to receipt of the (encrypted) combined value from the FPGA 110, the verification component 120 uses the shared cryptographic key to decrypt the combined value, and compares the combined value with the second combined value. If the two values are the same, then the FPGA 110 is operating with the approved configuration; however, if the two values are not the same, then the FPGA 110 is no longer operating with the approved configuration, with the dissimilarity between the values indicating that at least one of the reconfigurable blocks 140a-n at the FPGA 110 has been altered from its approved configuration.

Figure 2:
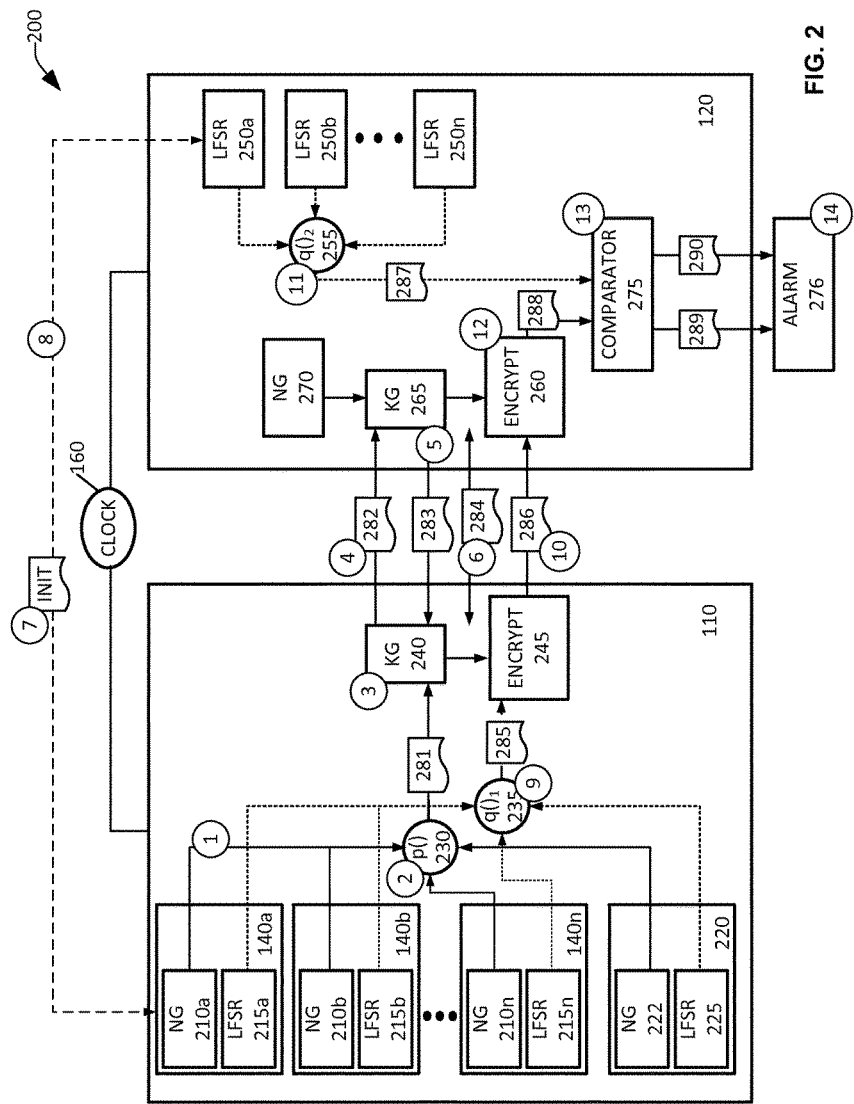
FIG. 2 illustrates an exemplary system for detecting modification of a FPGA and various acts involved.

Turning to FIG. 2, a system 200 is presented illustrating the various components that can be included in the FPGA 110 and the verification component 120, and further provides a methodology (a step through) detailing interaction between the various components of the system 200 during verification of the configuration of the FPGA 110.

The system 200 includes the FPGA 110 in communication with the verification component 120, wherein communication is via the path 130. The FPGA 110 further includes a plurality of reconfigurable blocks, wherein one or more of the reconfigurable blocks can be the partial reconfiguration blocks 140a-140n. As shown, each partial reconfiguration block 140a-140n includes a random number generator, such as NGs 210a-210n, respectively included in each partial reconfiguration block. The NGs 210a-210n can operate as TRNGs. Each partial reconfiguration block 140a-140n includes a feedback register, such as LFSRs 210a-210n, respectively included in each partial reconfiguration block.

As well as including partial reconfiguration blocks 140a-140n, the FPGA 110 can also include one or more non-partially reconfigurable blocks. As illustrated, FPGA 110 includes a non-partially reconfigurable block 220, which also includes a random number generator, NG 222, and a feedback register, LFSR 225. While, for the sake of readability, the subsequent description is directed towards operation of the partially reconfigurable blocks 140a-140n, NGs 210a-210n and LFSRs 210a-210n included therein, the various embodiments can be equally utilized with a FPGA 110 comprising both partially reconfigurable blocks and non-partially reconfigurable blocks. The various embodiments can be utilized based upon each partially reconfigurable block including a LFSR or other deterministic sequence generator. For a system 200 that does not include any partially reconfigurable blocks, a LFSR or other deterministic sequence generator can be incorporated into the configuration bitstream.

As shown, the FPGA 110 further includes a first function component 230 (p( )) and a second function component 235 (q( )$_1$). The first function component 230 combines respective outputs from the NGs 210a-210n and 222, and the second function component 235 combines respective outputs from the LFSRs 215a-215n and 225.

The FPGA 110 further comprises a first key generator unit (KG) 240, which can be utilized to generate a shared cryptographic key, which is shared between the FPGA 110 and the verification component 120. The KG 240 can utilize any suitable technology to generate the shared cryptographic key, such as point multiplication, elliptic curve point multiplication (ECPM), elliptic curve scalar multiplication (ECSM), etc. The FPGA 110 also includes an encryption component 245 which can be utilized to encrypt and decrypt data transmitted between the FPGA 110 and the verification component 120. Any suitable encryption technology can be utilized, such as advanced encryption standard (AES), Rijndael, data encryption standard (DES), etc. Further, the encryption technology can utilize any symmetric block cipher, stream cipher, etc. The first function component 230 (p( )), the second function component 235 (q( )$_1$), the KG 240, and the encryption component 245 combine to form a verification circuit in the FPGA 110.

Turning to the verification component 120, as shown, the verification component 120 includes a plurality of LFSRs 250a-250n, wherein the LFSRs 250a-250n can be utilized to generate outputs which can be compared with outputs from the LFSRs 215a-215n and 225 to verify a configuration of the FPGA 110. While the verification component 120 is shown as including the LFSRs 250a-250n, it is to be understood that the LFSRs 250a-250n can be representations of LFSRs. For example, the verification component 120 can include computer-executable instructions that, when executed by a processor, cause the processor to perform acts that mimic operation of LFSRs. The verification component 120 can include a third function component 255 (q( )$_2$) that combines the respective outputs from the LFSRs 250a-250n.

To enable encryption and decryption of data transmitted between the verification component 120 and the FPGA 110, the verification component 120 includes an encryption component 260. Encryption component 260 can operate with the same encryption technology as utilized by the encryption component 245 of the FPGA 110. The verification component 120 further comprises a second KG 265 which can be utilized during generation of the shared cryptographic key. The verification component 120 optionally further includes a number generator, NG 270, which can be utilized to generate a random number, which can be used to seed the second KG 265. Alternatively, the KG 265 can be seeded with a fixed value.

A comparator component 275 is included in the verification component 120, wherein the comparator component 275 is configured to compare states (current configuration setting) of the LFSRs 215a-215n with states (test configuration setting) of the LFSRs 250a-250n. If the current configuration setting and the test configuration setting are the same, the FPGA 110 is operating with the approved configuration. If the current configuration setting and the test configuration setting are not the same, the FPGA 110 has been reconfigured. The comparator component 275 can be further configured to generate a first notification indicating that the FPGA 110 is operating with the approved configuration, or can generate a second notification indicating that the FPGA 110 is not operating with the approved configuration, e.g., the FPGA 110 has been reconfigured. The first notification and the second notification can be transmitted to any component or device monitoring, or having an interest, in the operational state of the FPGA 110. For example, an alarm component 276 can be configured to execute one or more actions based upon receipt of the first notification or the second notification, e.g., log that the FPGA 110 is operating as expected, log that the FPGA 110 has been reconfigured, raise an alarm, etc.

As previously mentioned, during operation of the FPGA 110, states of the LFSRs 215a-215n can be updated. Since the verification component 120 verifies the configuration of the FPGA 110 by comparing states of the LFSRs 215a-215n with states of the LFSRs 250a-250n, it can be ascertained that, at the time of verification, a number of changes to the states of the LFSRs 215a-215n must be equivalent to the number of changes to the states of the LFSRs 250a-250n. There are numerous techniques to ensure that this occurs. In an example, the system 200 can include a shared clock 160, where clock signals output by the shared clock 160 are received by the FPGA 110 and the verification component 120. The FPGA 110 and the verification component 120 can be configured to update states of the LFSRs 215a-215n and 250a-250n, respectively, upon receipt of a clock signal from the shared clock 160, thereby synchronizing the above-mentioned states. Other mechanisms for synchronizing the states include updating states of the LFSRs of the FPGA 110 and the verification component 120 some defined number of times between verifications.

It is to be appreciated that while LFSRs are utilized in the various embodiments presented herein, e.g., LFSRs 215a-215n, 225, and 250a-250n, other components can be utilized, such as sequence generators, deterministic sequence generators, non-linear feedback shift registers, stream ciphers or other component(s) configured to generate a deterministic sequence of updates.

As shown, a plurality of acts 1-14 are presented in FIG. 2 as an exemplary methodology to depict interaction between the various components of the FPGA 110 and the verification component 120 during verification of a configuration of the FPGA 110. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

At 1, the NGs 210a-210n in each partially reconfigurable block 140a-140n located in the FPGA 110 are caused to generate output values, e.g., upon activation of the FPGA 110, or a subsequent time thereafter.

At 2, the output values are combined at the first function component 230, which executes a first function p( ) to combine the output values and generate a seed 281. It is to be appreciated that while the various embodiments presented herein utilize a plurality of NGs, e.g., NGs 210a-210n, at the FPGA 110, a single NG can be utilized to provide a single value to the function component 230 to generate the seed 281.

At 3, the seed 281 is forwarded from the first function component 230 for input into the KG 240. The KG 240 generates a first public key 282 based upon the seed 281. Owing to the seed 281 being randomly generated (e.g., as a function of the outputs from the NGs 210a-210n) and created at runtime, the seed 281 cannot be predicted based upon contents of the FPGA bitstream or from observation of previously generated seeds.

At 4, the first public key 282 produced by KG 240 is transmitted from the FPGA 110 to the verification component 120, wherein the first public key 282 is received at the second KG 265.

At 5, a second public key 283 can be transmitted to the FPGA 110. The second public key 283 can be fixed, updated each time the FPGA 110 is configured, or otherwise.

At 6, the KGs 240 and 265 of the FPGA 110 and the verification component 120 perform an elliptic curve Diffie-Hellman key exchange on the respectively received public keys to generate a shared symmetric key 284.

At 7, initial states of the LFSRs 215a-215n and the LFSRs 250a-250n can be respectively configured. For example, the KGs 240 and 265 can perform an elliptic curve Diffie Hellman key exchange to set the initial states of the above-referenced LFSRs. In another example, a random value can be selected and transmitted between the FPGA 110 and the verification component 120. By setting the LFSRs 215a-215n and the LFSRs 250a-250n to respective initial states, all of the LFSRs can be commonly adjusted (e.g., in accordance with a sequence, a stepped sequence), and thus any value(s) generated by the LFSRs 250a-250n will be comparable to a value(s) generated by the LFSRs 215a-215n when the FPGA 110 is operating with the approved configuration. However, if the configuration of the FPGA 110 is subsequently modified, the setting(s) on any of the LFSRs 215a-215n which have been modified will be modified to a setting(s) that does not form part of the stepped sequence from its initial setting, while the LFSRs 250a-250n will still be operating (e.g., sequentially updating) in accordance with their set initial condition. Hence, when a first output of the LFSRs 215a-215n in the modified condition is compared with a second output of the LFSRs 250a-250n in the unmodified condition (e.g., based upon the initial condition), the first and second outputs will be different and modification of the configuration applied to the FPGA 110 can be detected, as further described herein. Per the foregoing, the initial states of the LFSRs 215a-215n and the LFSRs 250a-250n are configured/produced at runtime of the FPGA 110 (e.g., as a function of the keys 282, 283, and/or 284), and thus cannot be predicted.

At 8, the settings applied to the LFSRs 215a-215n at the FPGA 110 can advance through a sequence of shifts comprising x-shifts from the initial state (e.g., in accordance with a shift register), where x is a positive integer. Similarly, the LFSRs 250a-250n can also advance through a sequence of shifts comprising the x number of shifts from the initial state. In an embodiment, the sequence of shifts at the respective LFSRs can be synchronized by the clock 160.

At 9, output values of the LFSRs 215a-215n at the FPGA 110 after the x number of shifts are combined at a second function component 235, which executes a second function $q(\ )_1$ on the output values to generate a result 285.

At 10, the result 285 is forwarded for encryption at the encryption component 245, wherein the encrypted result 286 is transmitted to the verification component 120.

At 11, output values from the LFSRs 250a-250n at the verification component 120 after the x number of shifts are combined at the third function component 255, which executes a third function $q(\ )_2$ on the output values to generate a test result 287. The test result 287 is forwarded to the comparator component 275.

At 12, the encrypted result 286 is decrypted at the encryption component 260, and the decrypted result 288 is forwarded to the comparator component 275.

At 13, the comparator component 275 compares the decrypted result 288 with the test result 287. In response to a determination that the decrypted result 288 and the test result 287 are the same, the comparator component 275 can generate a first notification 289 indicating that the FPGA 110 is operating with the approved configuration. In response to a determination that the decrypted result 288 and the test result 287 are not the same, the comparator component 275 can generate a second notification 290 indicating that the FPGA 110 is no longer operating with the approved configuration, the FPGA 110 has been reconfigured/modified.

At 14, the first notification 289 and/or the second notification 290 can be received by any component requiring notification of operation of the FPGA 110. In an embodiment, the first notification 289 and/or the second notification 290 can be received at an alarm component 276, wherein the alarm component 276 can be configured to perform any suitable operation, e.g., log that the FPGA 110 is operating as expected, log that the FPGA 110 has been reconfigured, raise an alarm, terminate operation of the FPGA 110, etc. The alarm component 276 can be located at any suitable location, e.g., located in the verification component 120, located in the FPGA 110, externally located—for example in a remotely located computer (not shown) monitoring/controlling operation of the FPGA 110.

Referring to act 7, if a subsequent approved modification of the FPGA 110 occurs, act 6 can be repeated such that another elliptic curve Diffie Hellman key exchange occurs, or a random value can be chosen and transmitted with the shared symmetric key, wherein the FPGA 110 and the verification component 120 can agree on a new state(s) to be applied to the LFSRs 250a-250n and 215a-215n, wherein the new state(s) can be considered a new "initial" state.

In an embodiment, while at act 11 the encrypted result 286 undergoes decryption by the encryption component 260, the test result 287 generated by the verification component 120 can undergo encryption (e.g., by the encryption component 260) and is fed into the comparator component 275, and similarly the encrypted result 286 can remain encrypted (e.g., is not decrypted by the encryption component 260) and is also fed into the comparator component 275. Accordingly, the encrypted test result 287 and the encrypted result 286 are compared directly by the comparator component 275.

As previously mentioned, advancement in the respective states of the LFSRs 215a-215n and the LFSRs 250a-250n through a sequence should be common, e.g., for example, the LFSRs can change state in lockstep. For verification of the FPGA 110 configuration, the verification component 120 advances the state of its LFSRs (e.g., LFSRs 250a-250n) and compares the result (e.g., test result 287) to the state of the FPGA's LFSRs (e.g., LFSRs 215a-215n), as contained in the decrypted result 288. A plurality of techniques can be utilized to achieve synchronization between the LFSRs 215a-215n and the LFSRs 250a-250n. As previously mentioned, in an embodiment, a shared clock (e.g., from clocking component 160) can be applied to the LFSRs 215a-215n and the LFSRs 250a-250n. In another embodiment, the state of the LFSRs can be advanced a fixed quantity x of times between verification cycles. In a further embodiment, the FPGA 110 only advances the state of LFSRs 215a-215n after being queried by the verification component 120. In another embodiment, the verification component 120 can be configured to send a message to the FPGA 110 defining how many times the state of the LFSRs 215a-215n should be advanced, wherein the states of the LFSRs 250a-250n are also advanced through the defined number of state transitions.

As previously described, the state of the LFSRs (e.g., LFSRs 215a-215n and LFSRs 250a-250n) and the cryptographic keys (e.g., 282, 283, 284) utilized to set an initial state of the LFSRs located at the FPGA 110 and the verification component 120 are created at runtime, and can change each time the FPGA 110 is configured, an adversary cannot determine the correct LFSR states without breaking the cryptography established between the FPGA 110 and the verification component 120. Accordingly, it is not possible for an adversary to replace a configuration (either partially or entirely) of any of the FPGA's reconfiguration blocks 140a-140n without being detected, even if a LFSR (e.g., any of LFSRs 215a-215n) is included in the malicious configuration, because the adversary will have no means of putting the LFSR into the correct state required for acceptable comparison with a value (e.g., test result 287) generated by the LFSRs 250a-250n. Hence, the various embodiments presented herein enable an integrity of the bitstream to be verified by checking the operation of a portion of the configuration, and does not require observation of the configuration bitstream itself. This can be advantageous for several reasons. Firstly, the various embodiments presented herein are less susceptible to replay attacks than direct observation of the configuration bitstream as the data used for verification is continuously changing. Further, the embodiments do not require a priori key sharing, for example, maintenance of a shared symmetric key, since the FPGA 110 and the verification component 120 agree on a new key each time the FPGA 110 is configured. Furthermore, the embodiments entail checking the correctness of a portion of the FPGA's 110 configuration, and thus, the verification component 120 can check the integrity of the entire configuration of the FPGA 110 without interrupting operation of the FPGA 110. Also, since the verification is based on the operation of the FPGA 110, rather than on the details of its configuration bitstream, the embodiments presented herein only require a small amount of data and processing when compared to a conventional approach of observing/processing an entire configuration applied to a FPGA.

Figure 3:
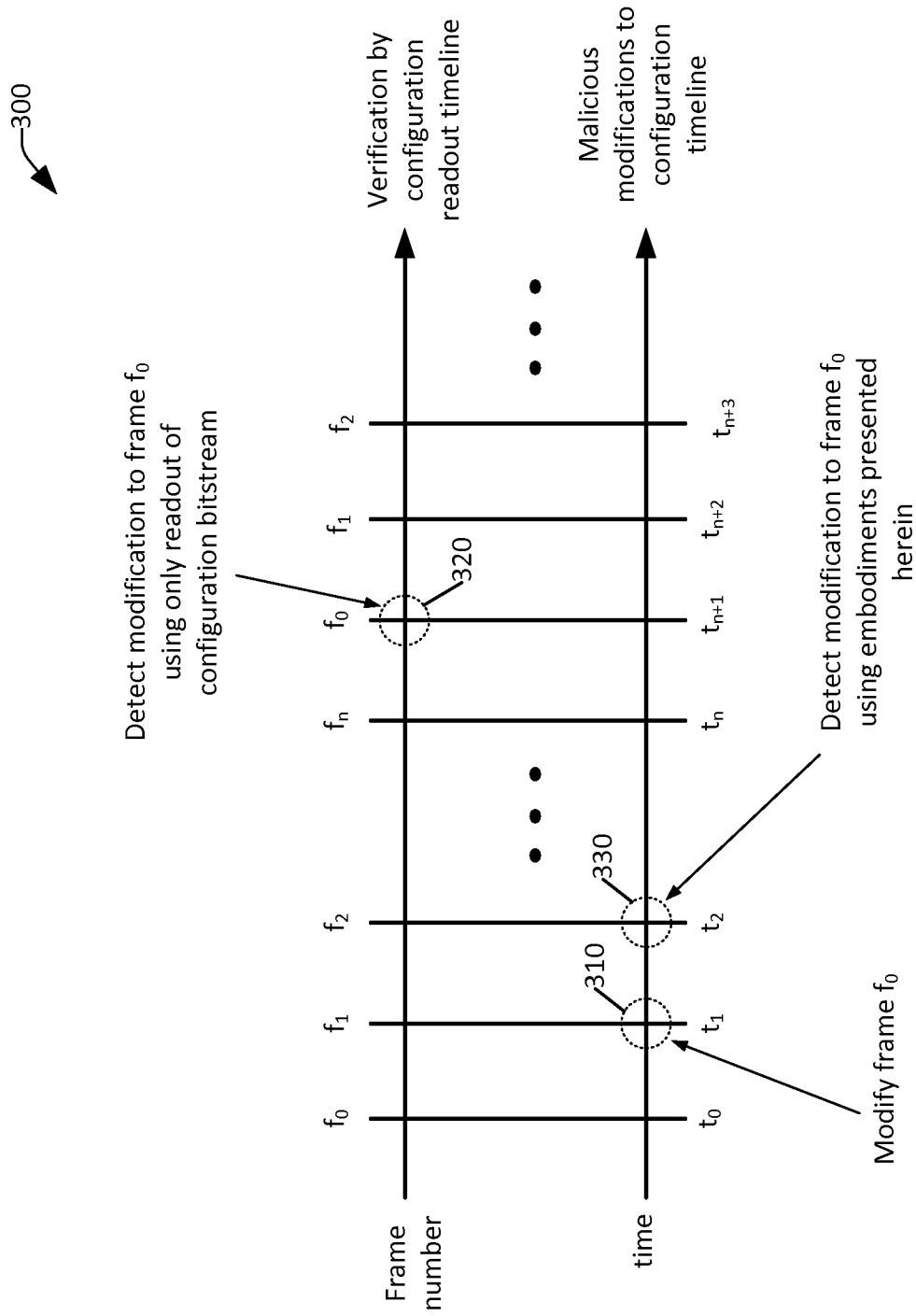
FIG. 3 is a schematic illustrating detection of FPGA modification, per various embodiments presented herein.

FIG. 3 illustrates comparison in operation of a system based upon the various embodiments presented herein (e.g., system 200) and a conventional system for detection of FPGA modification. The security of system 200 can be enhanced by utilizing the system 200 in conjunction with a technique of direct readout of the bitstream, wherein FIG. 3 illustrates a bitstream verification technique that relies on continuous readout of the configuration bitstream. As shown, the bitstream is read out of memory in the FPGA 110 in discrete units, referred to herein as frames $f_1$-$f_n$. Hence, at time $t_0$ frame $f_0$ is read, at time $t_1$ frame $f_1$ is read, and so on, until last frame $f_n$ is read at time $t_n$. The operation repeats, with frame $f_0$ being read out again at time $t_{n+1}$, at time $t_{n+1}$ frame $f_1$ is read again, etc.

In an exemplary situation presented in schematic 300, a configuration of the FPGA 110 is modified at 310 (e.g., by an adversary), wherein the modification involves modifying frame $f_0$ at time $t_1$. In a conventional approach, assuming that some source of freshness is included in the readout to prevent replay attacks, the modification will not be discovered until time $t_{n+1}$ (at 320). However, per the various embodiments presented herein with regard to a utilizing a configuration integrity approach, the modification can be identified sooner. For example, if state of the sequence generators is also checked at times $t_0$, $t_1$, etc., the modification is detected at time $t_2$ (at 330).

Figure 4:
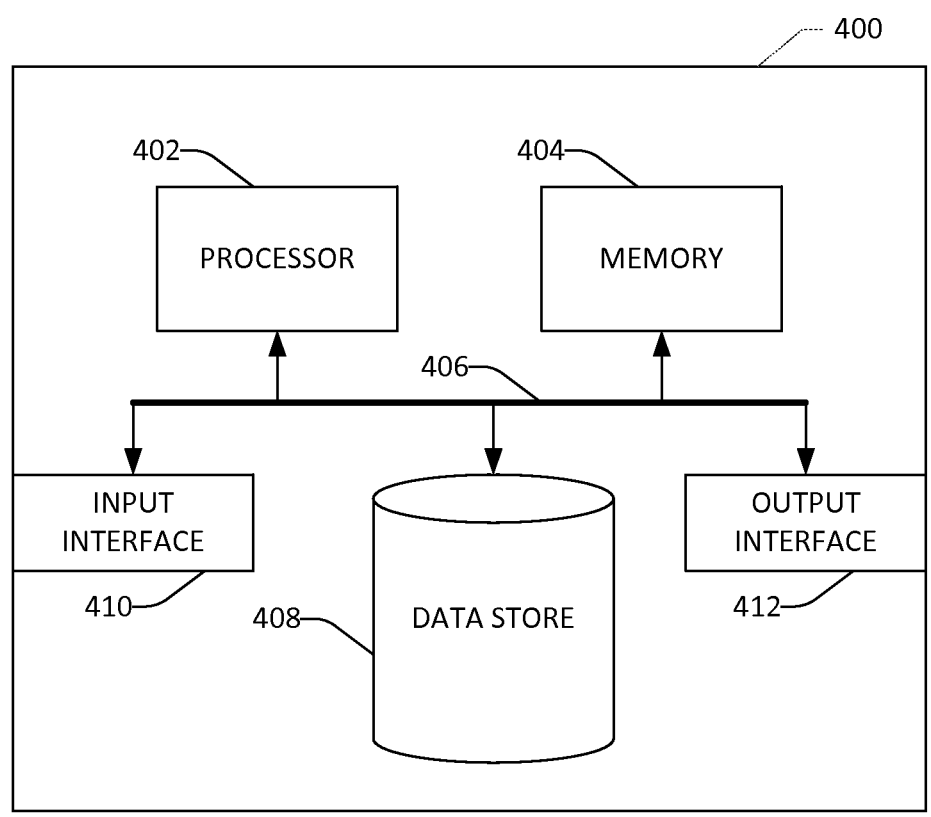
FIG. 4 illustrates an exemplary computing device.

Referring now to FIG. 4, a high-level illustration of an exemplary computing device 400 that can be used in accordance with the systems and methodology disclosed herein is illustrated. For example, the computing device 400 can operate as the verification component 120 and/or a portion thereof. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store signatures, time-series signals, etc.

The computing device 400 additionally includes a data store 408 that is accessible by the processor 402 by way of the system bus 406. The data store 408 may include executable instructions, configuration values, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc., by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
    a field programmable gate array (FPGA) that comprises a first sequence generator having a first state, the FPGA has a configuration;
    a verification component that is in communication with the FPGA, the verification component comprising a second sequence generator having a second state, the verification component configured to verify that the configuration is an approved configuration of the FPGA based upon the second state and data received from the FPGA, the data based upon the first state of the first sequence generator; and
    a shared clock, wherein the verification component and the FPGA synchronously update states of the first sequence generator and the second sequence generator based upon clock signals emitted from the shared clock, and further wherein the verification component determines that the configuration has been altered when the comparator component determines that the current configuration setting is inequivalent to the test configuration setting, wherein operation of the FPGA is terminated responsive to the verification component determining that the configuration has been altered.

2. The system of claim 1, wherein the FPGA further comprises:
    a reconfigurable block, wherein the reconfigurable block includes the first sequence generator.

3. The system of claim 1, wherein the FPGA generates a current configuration setting based upon the first state of the first sequence generator, the verification component generates a test configuration setting based upon the second state of the second sequence generator, the verification component further comprises:
    a comparator component configured to compare the current configuration setting with the test configuration setting to determine whether the current configuration setting is equivalent to the test configuration setting, wherein the verification component verifies that the configuration is an approved configuration of the FPGA when the comparator component determines that the current configuration setting is equivalent to the test configuration setting.

4. The system of claim 3, wherein the verification component is further configured to generate a notification when the comparator component determines that the current configuration setting is inequivalent to the test configuration setting.

5. The system of claim 1, wherein the first and second sequence generators are linear feedback shift registers, non-linear feedback shift registers, or stream ciphers.

6. The system of claim 1, wherein the FPGA causes the first sequence generator to alter the first state to a third state, wherein further the verification component causes the second sequence generator to alter the second state tot a fourth state, and wherein the verification component verifies that the configuration is an approved configuration of the FPGA based upon the third state of the first sequence generator and the fourth state of the second sequence generator.

7. A method comprising:
   at a field programmable gate array (FPGA) that comprises a first sequence generator, transmitting a current configuration setting to a verification component that is in communication with the FPGA, wherein the verification component comprises a second sequence generator, the current configuration setting being indicative of a configuration of the FPGA, the current configuration setting is based upon a state of the first sequence generator of the FPGA; and
   at the verification component, determining that the configuration of the FPGA is an unapproved configuration based upon the current configuration setting received from the FPGA and a state of the second sequence generator of the verification component, wherein the first sequence generator of the FPGA and the second sequence generator of the verification component are synchronized by a clock that is coupled to both the FPGA and the verification component, and further wherein determining that the configuration of the FPGA is an unapproved configuration comprises determining that the current configuration setting is inequivalent to the test configuration setting, wherein operation of the FPGA is terminated responsive to determining that the configuration of the FPGA is unapproved.

8. The method of claim 7, further comprising:
   at the FPGA, prior to transmitting the current configuration setting, encrypting the current configuration setting with a shared cryptographic key; and
   at the verification component, decrypting the encrypted current configuration setting using the shared cryptographic key.

9. The method of claim 8, further comprising:
   generating the shared cryptographic key, wherein generating the shared cryptographic key comprises:
      at the FPGA:
         generating a public key for the FPGA based upon output from a random number generator; and
         transmitting the public key to the verification component;
      at the verification component, transmitting a public key for the verification component to the FPGA; and
      at both the FPGA and the verification component, generating the shared cryptographic key based upon the public key for the FPGA and the public key for the verification component.

10. The method of claim 9, wherein generating the shared cryptographic key based upon the public key for the FPGA comprises performing an elliptic curve Diffie Hellman key exchange to generate the shared cryptographic key.

11. The method of claim 10, further comprising:
    at the FPGA, transmitting a value generated by a random number generator to the verification component, wherein an initial state of the sequence generator of the FPGA is based upon the value.

12. The method of claim 11, further comprising:
    at the verification component, setting the state of the sequence generator of the verification component based upon the value received from the FPGA.

13. The method of claim 12, further comprising:
    at the verification component:
       generating a test configuration setting based upon the state of the sequence generator of the verification component; and
       determining that the configuration of the FPGA is an unapproved configuration based upon the test configuration setting.

14. The method of claim 7, the verification component being an FPGA.

15. A field programmable gate array (FPGA) having a configuration, the FPGA comprising:
    a plurality of partially reconfigurable hardware blocks, each of the partially reconfigurable hardware blocks comprises a sequence generator, the sequence generators having respective states;
    a first circuit that is configured to generate a value based upon the states of the sequence generators; and
    a second circuit that is configured to transmit the value to a verification component that is in communication with the FPGA, wherein the verification component is configured to determine that the configuration of the FPGA is an unapproved configuration based upon the value transmitted by the FPGA and a state of at least one sequence generator of the verification component, wherein states of the sequence generators of the FPGA and the at least one sequence generator of the verification component are synchronously updated responsive to receipt of signals from the shared clock, and further wherein operation of the FPGA is ceased in response to determining that the configuration of the FPGA is an unapproved configuration.

16. The FPGA of claim 15, wherein prior to the second circuit transmitting the value to the verification component, the FPGA encrypts the value using a shared cryptographic key that is shared with the verification component.

* * * * *